Aug. 18, 1942.    G. W. CAUSEY    2,293,489
STRUCTURAL ELEMENT
Filed March 1, 1941    2 Sheets-Sheet 1
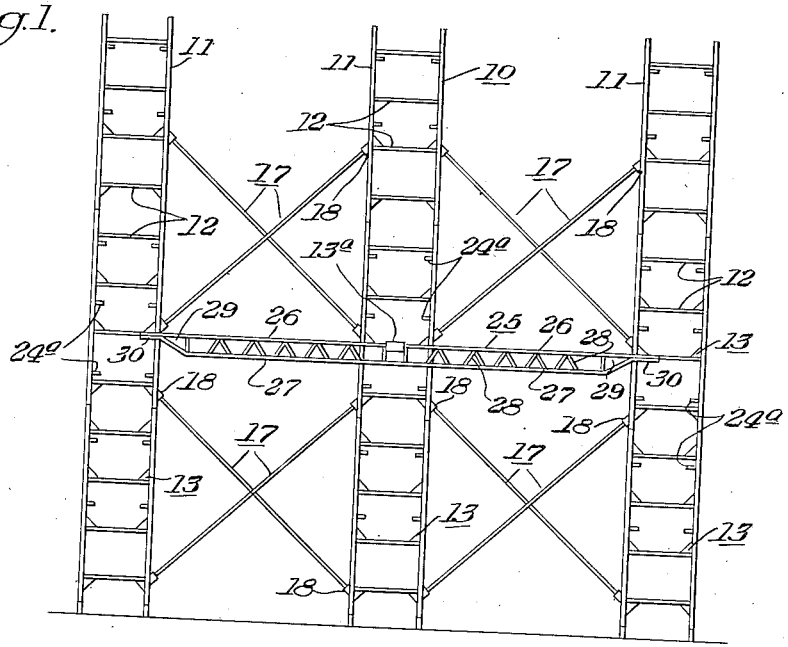
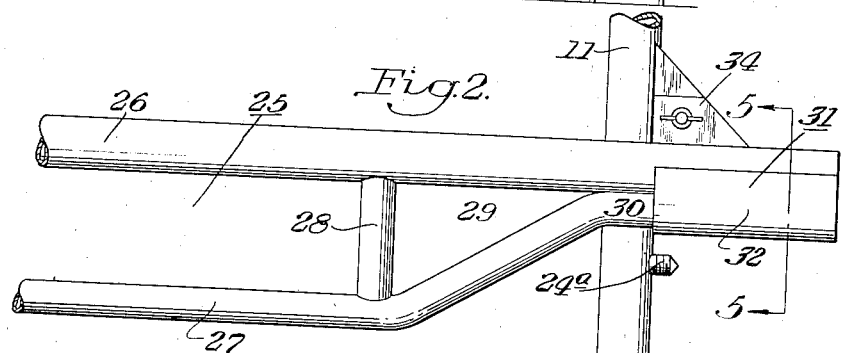
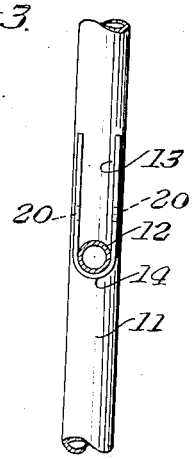
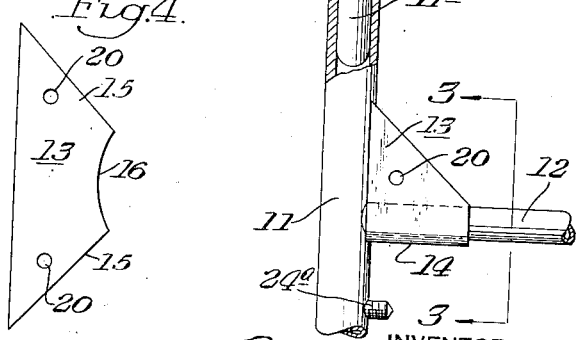
INVENTOR
George W. Causey
BY
Edward A. Lawrence
his ATTORNEY Aug. 18, 1942.　　　G. W. CAUSEY　　　2,293,489
STRUCTURAL ELEMENT
Filed March 1, 1941　　　2 Sheets-Sheet 2
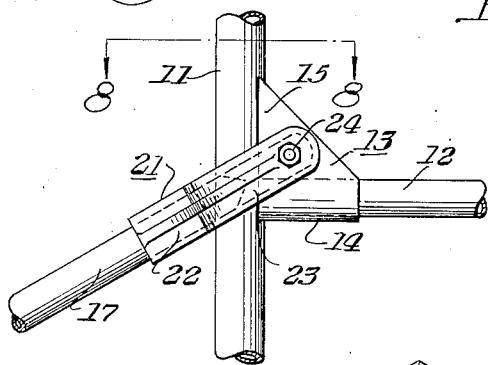
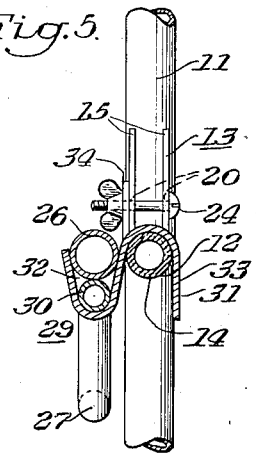
INVENTOR
George W. Causey
BY
Edward A. Lawrence
his ATTORNEY Patented Aug. 18, 1942

2,293,489

UNITED STATES PATENT OFFICE 2,293,489

STRUCTURAL ELEMENT

George W. Causey, Pittsburgh, Pa.

Application March 1, 1941, Serial No. 381,360

14 Claims. (Cl. 189—19)

My invention relates to structural erections, and while it may be used with great advantage in the erection of permanent structures, it is particularly useful and convenient for temporary structures, such as scaffolding, arena seats, derricks and the like, wherein the structural elements are intended for repeated assemblage and disassemblage.

One of the principal objects which I have in view is the provision of a new and improved primary element which may be used as an upright post or main support for the structure, or which may be used as a horizontal or inclined supporting element.

For this purpose I provide a ladder-like element comprising parallel longitudinal members or legs connected together at intervals by cross-struts which maintain the legs in permanent spaced relation. I provide new and improved means for connecting the cross-struts at their ends to the legs, thus adding strength and rigidity to the element with a minimum of weight.

Another object in view is the provision of an improved cross-bracing between adjacent or spaced apart primary elements where, as for instance, they are employed as posts or vertical supports for a structure.

For this purpose I provide a novel form of fitting or yoke which aids in connecting the ends of the braces to the primary member.

Another object in view is the provision of an improved beam or supporting member, usually horizontally disposed, and means for connecting the ends of the same to the primary members.

My improved beam comprises parallel and spaced apart tubular members held in permanent spaced relation by means of connecting struts, the extremities of the lower member, which is preferably of lesser diameter, being bent toward and into contact with the upper member and then extended parallel thereto, these parallel portions of the members being welded together. Novel means, hereinafter described, are provided for detachably connecting the ends of the beam to the primary members or other supports.

Another object which I have in view is the provision of an improved footing or undersupport for such primary elements when they are employed as posts or vertical supports for the structure, and which footings being extensible to permit the proper leveling of the structure on uneven surfaces.

For this purpose I cause the lower ends of the legs to converge and support between them and the lowermost cross-strut of the element a post which is provided with a longitudinal bore to receive a screw rod which is connected, preferably by a flexible joint, to the footing plate, a nut being screwed on said rod and bearing upwardly on the lower end of the post, so that by adjusting the nut along the screw rod, the primary element may be raised or lowered as desired, to level the structure and provide it with firm undersupport.

Other objects and other novel features of construction and arrangement of parts will appear from the following description.

In the accompanying drawings, wherein is illustrated a practical embodiment of the principles of my present invention, Fig. 1 is an elevation illustrating the assemblage of my improved structural elements for use.

Fig. 2 is an enlarged fragmentary view of a portion of the structure shown in Fig. 1.

Fig. 3 is a view partly in section along the line 3—3 in Fig. 2, showing the attachment of the ends of one of the cross struts to the longitudinal members.

Fig. 4 is a plan view of the metal plate or blank which is bent up to form the stirrup for bracing the end of the strut to the leg.

Fig. 5 is a detail, partly in section along the line 5—5 in Fig. 2, showing the saddle fitting which I employ for connecting up the end of the beam to the primary element or other support.

Fig. 6 is a perspective of the saddle which is attached to the end of the beam for connecting the latter to the primary element.

Fig. 7 is a detail showing the end connection for the cross braces.

Fig. 8 is a plan view of the same partly in section along the line 8—8 in Fig. 6.

Fig. 9 is an elevation of the footing section used to undersupport a primary element when the latter is employed as a post or vertical supporting element of the assembled structure.

Fig. 10 is a horizontal section of the same taken along the line 9—9 in Fig. 8.

Fig. 11 is a detail showing the footing plate, the screw shaft and the adjustment nut, the post being shown in section.

Referring to the drawings, the primary element which I employ in my structure is indicated at 10, and comprises the longitudinal members or legs 11 connected together at spaced intervals by the cross-struts 12. Preferably the legs and struts are lengths of steel tubing, the legs being tubes of greater exterior diameter than the struts.

The extremities of the tubular struts are cut off to form an arcuate edge to fit snugly against the outer surface of the legs so as to fit snugly against the latter.

13 indicates stirrups which are formed by bending up the blank metal plate shown in Fig. 4 to form an arcuate bottom trough 14 and two upwardly extending side walls 15 spaced apart sufficiently to receive and encompass the strut 12 which fits in the trough.

The edges of the walls 15 and of the arcuate inner end 16 of the trough fit against the wall of the leg 11 and are securely welded thereto and the arcuate end of the strut 12 is butt welded to the leg and the strut is also welded to the walls 15 of the stirrup.

Thus the ends of the struts 12 are welded directly to the legs 11 and to the stirrups by which the struts are undersupported, and the stirrups are welded to the legs 11.

This provides a very strong and permanent connection between the struts and the legs, producing a rigid element of great strength with a minimum of weight.

An important advantage is that no holes are made in the walls of the tubular legs and thus the legs are not weakened but are in fact reinforced by the connection of the struts thereto.

Thus the primary element 10 is of great strength and rigidity, and yet owing to the means for attaching the cross-struts 12 to the legs or longitudinal members 11, the element may be made of relatively light tubular steel which may be readily handled by a workman. The elements 10 may be made in units of convenient length for handling and for assemblage to the desired height or length, the ends of the aligned legs of adjacent units being connected in any convenient manner, as by the pin and socket union indicated at 11a.

The adjacent primary elements are cross-braced by means of the braces 17 which are preferably steel tubes with their ends flattened as at 18 and pierced by the bolt hole 19. When the brace is in position, usually inclined as shown, the flattened end abuts in surface contact the exterior surface of one of the walls 15 of the stirrup 13 which connects the end of one of the cross-struts 12 to the leg 11 of a primary element 10, and the hole 19 registers with the aligned holes 20 in the twin walls 15.

21 indicates a fitting comprising a sleeve 22 and integral therewith an angular arm 23 whose inner end is bent to offset the arm 23, as best shown in Fig. 8. The sleeve 22 which is slipped over the end of the brace 17 past the flattened end 18, and the arm 23 which is parallel to and spaced from the flattened end 18 of the brace provide a fork which straddles the leg 11 and the stirrup 13. The arm 23 is provided with a bolt hole which registers with the hole 20 in the adjacent stirrup wall 15, so that a bolt 24 may be inserted through the registering holes 19 and 20 and the hole in the arm 23 to clamp the end of the brace to the primary element 10.

The braces are preferably crossed between the adjacent primary elements, as shown in Fig. 1. Horizontally disposed braces may also be provided.

The foregoing bracing is intended primarily for the cross bracing of primary elements disposed in the same vertical plane. Where two or more primary elements in the same vertical plane are to be cross braced with primary elements disposed in a parallel plane, for instance to form a bay or rectangular structure, I prefer to connect the flattened and pierced ends of the cross-braces 17 to the threaded studs 24a extending inwardly from the legs 11 of the elements 10 and apply wing or other nuts to the studs to hold the ends of the braces in place.

25 designates a beam which may be mounted on the primary elements 10 either horizontally as in case a flooring is to be supported, or at an incline as where arena seats or an inclined platform is to be mounted thereon.

My novel beam comprises two tubular longitudinal members 26 and 27 which, except adjacent to their extremities, are parallel and rigidly connected together in spaced relation by the struts 28 which are welded at their ends to the longitudinal members 26 and 27. Adjacent their ends the lower member 27 is bent upwardly into contact with the member 27 as at 29 and thence extends parallel thereto, as at 30, the portions 30 being welded to the member 26.

31 indicates a saddle formed of a plate metal blank of a substantially horizontally disposed S-shape comprising an upwardly open trough-portion 32 in which the end of the member 25 is received as shown in Fig. 5 and wherein it is welded in place, and an integral inverted trough portion 33, of less length than the trough 32 and offset therefrom so as to hook over the adjacent strut 12 of the primary element 10, as also shown in Fig. 5. 34 indicates a tongue of the metal which is bent upwardly from the top inner edge of the trough 32 and fits flat against the outer surface of the adjacent wall 15 of the stirrup 13 of the strut 12, and said tongue is pierced with a bolt hole 35 which registers with the bolt hole 20 in said wall so that the bolt 24 may be inserted through the holes 20 and 35 and a wing or other nut tightened thereon.

As the beam 25 is in effect an open truss, when under load upper longitudinal member 26 functions as the compression member while the member 27 is the tension member. Therefore the diameter of the member 27 may be, and preferably is, considerably less than that of the member 26.

Where, as in Fig. 1, the beam 25 is connected, as described, at its ends to the outer vertical elements 10 and crosses an intermediate element 10, I prefer to provide the upper longitudinal member 26 of the beam 25 with a saddle 13a, similar to the saddle members 13 except that its upwardly open trough portion encompasses only the upper member 26 of the beam and said saddle is not provided with a tongue 34. As in the case of the saddles 13, the downwardly open trough portion of the saddle 13a hooks over the adjacent cross-strut 12 of the intermediate post 10.

Referring now to Figs. 9, 10 and 11, I show therein the adjustable footing with which I prefer to provide the primary elements 10 when the same are used as posts or vertical supports where the floor, ground or other supporting surface is uneven or irregular.

Thus 36 indicates the footing element which comprises the tubular legs or longitudinal members 37 which are held in permanent relation of the same spacing as the legs 11 of the elements 10, by means of the cross-struts 38, this construction being like that of said primary elements so that the footing may be assembled underneath and in alignment with the lowermost primary element of a structural post or column, the upper ends of the legs 37 being connected, as by pin and socket connection, to the lower ends of the legs 11 of the superimposed element 10.

The lower portions of the legs 37 of the footing element 36 are bent inwardly or converge toward each other and are welded to the lower ends of a pair of parallel spaced apart tubes 39 which extend vertically to and are welded to the lowermost cross strut 38. 40 indicates rectangular metal boxings, one of which is welded to the inner surfaces of the tubes 39 adjacent their lower ends, and the other of which is welded between the upper ends of the tubes 39 and also to the lowermost cross-strut 38.

Fitted in the upper and lower boxings 40 is a vertically disposed wooden post 41 which is held in place by means of bolts 42. The post 41 is provided with an axial bore 43 extending upwardly from its lower end to provide clearance for the upper portion of a screw shaft 44 whose lower end is preferably flexibly connected as by the ball and socket joint 45, to the foot plate 46, which rests upon the ground or other supporting surface.

47 indicates a nut, provided with radial handles, and screwed on the shaft 44 and bearing upwardly against the lower end of the post 41 and the lower boxing 40. Thus the element 36 is supported by the nut 47, and accordingly when the nut is run up or down on the screw shaft, the footing element, with the structure undersupported thereby, is raised or lowered. 47a indicates a lock nut to prevent accidental movement of the nut 47 relative to the shaft 44.

Thus any of the vertical supports or posts may be individually leveled and rendered firm.

It is evident from the foregoing description that the application of my invention to construction work is attended by great advantage, especially in the case of temporary or take-down structures, such as scaffolding, arena seats, derricks and the like, as the various elements or parts are not only of great strength and rigidity but owing to their relative light weight are easily handled and readily connected up in assembling and disconnected when the structure is to be disassembled.

I claim:

1. A structural element for the purposes described comprising, in combination, a pair of longitudinal members in spaced relation, pairs of aligned trough-shaped stirrups having their rear edges welded to the opposite longitudinal members, and cross-struts spanning the space between said longitudinal members and having their ends supported in said stirrups and abutting against the longitudinal members, said struts being welded to the stirrups and to the longitudinal members.

2. A structural element for the purposes described comprising, in combination, a pair of longitudinal members in spaced relation, pairs of aligned trough-shaped stirrups having their rear edges welded to the opposite longitudinal members, cross-struts spanning the space between said longitudinal members and having their ends supported in said stirrups and abutting against the longitudinal members, said struts being welded to the stirrups and to the longitudinal members, and means for connecting other structural members to said stirrups.

3. In a structure of the character described, a fitting, for use in attaching a subsidiary member such as a cross-brace to a primary element such as a vertical support, comprising a sleeve arranged to be slipped over the end of the brace and an extension from the sleeve disposed parallel to and spaced from the protruding end of the brace to form a fork to straddle a portion of the primary element, and fastening means connecting the free end of the extension and the protruding extremity of the brace to hold the brace in operative position.

4. In a structure of the character described, a fitting, for use in attaching a subsidiary member such as a cross-brace to a primary element such as a vertical support, comprising a sleeve arranged to be slipped over the end of the brace and an extension from the sleeve disposed parallel to and spaced from the protruding end of the brace to form a fork to straddle a portion of the primary element, the free end of the extension being provided with a hole registering with a hole in the extremity of the brace to receive a bolt to hold the brace in its operative position.

5. In a structure of the character described, a fitting, for use in connecting a subsidiary member, such as a cross-brace, to a primary element, comprising a pair of longitudinal members connected together by spaced apart cross-struts, said fitting comprising a sleeve arranged to be slipped over the end of the brace and an extension from said sleeve disposed parallel to and spaced from the protruding extremity of the brace forming a fork to straddle one of the longitudinal members of the primary element, and means to connect the extremities of the brace and the extension to hold the brace assembled with the primary element.

6. In a structure of the character described, a fitting, for use in connecting a subsidiary member, such as a cross-brace, to a primary element comprising a pair of longitudinal members connected together by spaced apart cross-struts, said fitting comprising a sleeve arranged to be slipped over the end of the brace and an extension from said sleeve disposed parallel to and spaced from the protruding extremity of the brace forming a fork to straddle one of the longitudinal members of the primary element, said extension and the brace having aligned holes and fastening means engaging said holes to hold the brace assembled with the primary element.

7. In a structure of the character described, a fitting, for use in connecting a subsidiary member, such as a cross-brace, to a primary element comprising a pair of longitudinal members connected together by spaced apart cross-struts and reinforcing means connecting the end portions of the cross-struts to the longitudinal members, said fitting comprising a sleeve arranged to be slipped over the end of the brace and an extension from said sleeve disposed parallel to and spaced from the protruding extremity of the brace forming a fork to straddle a longitudinal member of the primary member, and means engaging the extremities of the brace and of the extension and also engaging the reinforcing means to maintain the brace assembled with the primary element.

8. In a structure of the character described, a fitting, for use in connecting a subsidiary member, such as a cross-brace, to a primary element comprising a pair of longitudinal members connected together by spaced apart cross-struts and stirrup brackets welded to the longitudinal members and supporting the end portions of the cross-struts to the longitudinal members, said fitting comprising a sleeve arranged to be slipped over the end of the brace and an extension from said sleeve disposed parallel to and spaced from the protruding extremity of the brace forming a fork to straddle a longitudinal member of the primary member, and means engaging the extremities of the brace and of the extension and also engaging the stirrup bracket to maintain the brace assembled with the primary element.

9. In a temporary take-down structure such as scaffolding and the like, a connection between a ladder-like primary element such as a vertical post and a secondary element such as a cross brace, consisting of a U-shape plate having its vertical edges welded to one of the legs of the primary element and supporting the end portion of one of the cross-struts of the latter and permanently secured thereto, the side walls of said plate provided with registering boltholes, the end portion of the secondary element extending along at least one of the sides of said plate and provided with a transverse hole registering with the holes in said plate, and a bolt engaging said registering holes to clamp the secondary element to the main element.

10. The connection as specified in claim 9 in which the secondary element is provided with a bifurcated end portion, and the clamping bolt engages registering holes in both side walls of the U-shape plate and in both sides of the fork.

11. The connection as specified in claim 9 in which one of the end portions of the secondary element is provided with a sleeve, an arm carried by the sleeve and so disposed as to provide said secondary element with a bifurcated end which straddles the leg of the primary element, and the clamping bolt extends through registering holes in the walls of the U-shape plate and the both sides of the fork of the secondary element.

12. The connection as specified in claim 9 in which the end portion of the secondary element is in the form of a second plate provided with a trough-shape portion in which the secondary element is seated and permanently secured and with a second inverted trough-shape portion which hooks over the cross-strut and a flat portion which engages in surface contact with the first plate, the clamping bolts engaging registering holes in both plates.

13. In a temporary take-down structure such as scaffolding and the like, a connection between a ladder-like primary element such as a vertical post and a secondary element such as a brace, comprising a plate located at the angle between one of the legs of the primary element and one of its cross-struts and permanently attached to both of the same, a second plate carried by the end portion of the secondary element and having a portion in flat surface contact with the first mentioned plate and said second plate provided with an inverted trough portion which hooks over the cross-strut, and means for clamping said plates firmly together.

14. In a temporary take-down structure such as scaffolding and the like, a connection between a ladder-like primary element such as a vertical post and a secondary element such as a brace, comprising a plate located at the angle between one of the legs of the primary element and one of its cross-struts and permanently attached to both of the same, a second plate carried by the end portion of the secondary element and having a portion in flat surface contact with the first mentioned plate and said second plate provided with a trough-portion in which the secondary element is seated and secured and an inverted trough-portion which hooks over the cross-strut, and means for clamping said plates firmly together.

GEORGE W. CAUSEY.